United States Patent
Wing et al.

(10) Patent No.: US 10,375,020 B2
(45) Date of Patent: Aug. 6, 2019

(54) SECURITY POLICY FOR HTTPS USING DNS

(71) Applicant: Cisco Technology, Inc., San Jose, CA (US)

(72) Inventors: Daniel G. Wing, San Jose, CA (US); K. Tirumaleswar Reddy, Karnataka (IN); Prashanth Patil, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 15/408,616

(22) Filed: Jan. 18, 2017

(65) Prior Publication Data
US 2018/0205734 A1 Jul. 19, 2018

(51) Int. Cl.
*H04L 29/06* (2006.01)
*H04L 29/12* (2006.01)
*H04L 29/08* (2006.01)

(52) U.S. Cl.
CPC ...... *H04L 63/0236* (2013.01); *H04L 61/1511* (2013.01); *H04L 63/101* (2013.01); *H04L 63/168* (2013.01); *H04L 63/20* (2013.01); *H04L 67/02* (2013.01); *H04L 67/10* (2013.01); *H04L 67/42* (2013.01); *H04L 2463/121* (2013.01)

(58) Field of Classification Search
CPC . H04L 63/10; H04L 61/1511; H04L 63/0236; H04L 67/02; H04L 67/42
See application file for complete search history.

(56) References Cited

U.S. PATENT DOCUMENTS 6,987,987 B1 * 1/2006 Vacanti ............... G06Q 10/087
455/556.2
7,849,507 B1 12/2010 Bloch et al.
(Continued)

FOREIGN PATENT DOCUMENTS

KR 20100078087 A 7/2010

OTHER PUBLICATIONS

Matt Prytuluk, "Block Page Errors: Installing the Cisco Root CA", OpenDNS, https://support.opendns.com/hc/en-us/articles/227987007#FF, last accessed Jan. 9, 2017, 2 pages.
(Continued)

*Primary Examiner* — Lynn D Feild
*Assistant Examiner* — Jessica J South
(74) *Attorney, Agent, or Firm* — Edell, Shapiro & Finnan, LLC

(57) ABSTRACT

In one embodiment, a browser operating on a host device receives, from a user, a request to access a web server that includes a Uniform Resource Locator (URL) associated with the web server. In response, the browser sends, to a Domain Name System (DNS) server, a request for an Internet Protocol (IP) address correlated with the domain hosting the URL, and receives, from the DNS server, a response that comprises a block policy IP address and an appropriate error code. Based on this IP address and the error code indicated in the response, the browser renders an access denied page indicating that access to the web server associated with the URL is not permitted, wherein at least a portion of the access denied page is stored in memory accessible to the browser prior to sending the request for the IP address correlated with the domain that is hosting the URL.

17 Claims, 7 Drawing Sheets

(56) References Cited

U.S. PATENT DOCUMENTS

| | | | |
|---|---|---|---|
| 2001/0052007 A1 | 12/2001 | Shigezumi | |
| 2003/0055962 A1* | 3/2003 | Freund | H04L 63/0263 709/225 |
| 2005/0235044 A1* | 10/2005 | Tazuma | G06F 17/30887 709/217 |
| 2008/0172382 A1* | 7/2008 | Prettejohn | H04L 63/126 |
| 2010/0169472 A1* | 7/2010 | Okamoto | G06F 21/552 709/224 |
| 2014/0283063 A1 | 9/2014 | Thompson et al. | |
| 2015/0304865 A1* | 10/2015 | Poscher | H04W 76/10 370/252 |
| 2016/0247486 A1* | 8/2016 | Chakraborty | G09G 5/24 |
| 2016/0352761 A1 | 12/2016 | McGrew et al. | |

OTHER PUBLICATIONS

David McGrew et al., "A package for capturing and analyzing network flow data and intraflow data, for network research, forensics, and security monitoring.", GitHub, https://github.com/davidmcgrew/joy, last accessed Jan. 9, 2017, 5 pages.

* cited by examiner

SECURITY POLICY FOR HTTPS USING DNS

TECHNICAL FIELD

The present disclosure relates to the automated provisioning of a blocking notification during a web browsing session.

BACKGROUND

Network administrators often block user devices connected to an enterprise network from accessing unknown or malicious websites to enhance security, to increase productivity or to conserve network resources. For example, when a user device attached to an enterprise network sends a request to establish a Hypertext Transfer Protocol over Transport Layer Security (HTTPS) connection with an external website associated with a given Uniform Resource Locator (URL), an enterprise security device may intercept the request and abruptly terminate the HTTPS connection with the user device without notifying the user why the request was denied, or the browser may encounter HTTPS certificate errors if the browser is redirected via DNS to a web page hosted elsewhere that displays a block page. An end user therefore may not know why the connection was reset and, consequently, may repeatedly try to unsuccessfully reach the external website. Frustrated, the end user may use insecure interfaces to reach the external web site, compromising the security and integrity of the enterprise network. Furthermore, certificate errors train users to click through certificate errors, which is poor security practice. To eliminate the need for an end user to click through certificate errors, an end user or an IT administrator may install a root certificate on a host device. Doing so, however, is also poor security practice as it creates a security vulnerability that may be exploited by a man-in-the-middle attack.

Additionally, end users are increasingly using "bring your own devices" (BYOD) devices to connect to distinct enterprise domains, but may not be aware of the different access rules and policies enforced across those domains, potentially creating further security vulnerabilities that may cause significant damage to the networks themselves.

DESCRIPTION OF EXAMPLE EMBODIMENTS

Overview

In accordance with one embodiment, a browser operating on a host device receives, from a user, a request to access a web server that includes a Uniform Resource Locator (URL) associated with the web server. In response, the browser sends, to a Domain Name System (DNS) server, a request for an Internet Protocol (IP) address correlated with the domain hosting the URL, and receives, from the DNS server, a response that comprises a block policy IP address and an appropriate error code. Based on the block policy IP address and the error code indicated in the response, the browser renders an access denied page indicating that access to the web server associated with the URL is not permitted, wherein at least a portion of the access denied page is stored in memory accessible to the browser prior to sending the request for the IP address correlated with the domain that is hosting the URL.

Example Embodiments

Currently, intrusion prevention systems (IPS), next-generation firewalls (NGFWs), and Cloud Web Security (CWS) servers act as Transport Layer Security (TLS) proxies that inspect payloads and block malicious content from reaching user devices attached to enterprise networks. Having man-in-the-middle devices, however, may create various security and privacy threats for the enterprise networks. Furthermore, installing root certificate authorities (CAs) onto numerous host devices is cumbersome and may cause further security threats as the certificates themselves may be compromised. To reduce these threats, Machine Learning (ML) classifiers may be used to identify malicious data flows, benign data flows and application types initiating the data flows, (e.g., file transfer, one-way video streaming, etc.), and take appropriate actions based on the identifications. For example, if an encrypted data flow is identified as being malicious, the ML classifier may program an on-path Transmission Control Protocol (TCP) proxy or a middle-box to reset or terminate an HTTPS connection, either directly or indirectly, using a Software Defined Network (SDN) controller.

Abruptly terminating an HTTPS connection, however, may frustrate an end user, causing the end user to repeatedly attempt to reach a URL because the end user does not know why the connection was blocked or terminated. As a result, the end user may use insecure interfaces on the user device to reach the URL that do not offer security or privacy protection mechanisms, creating vulnerabilities for both the user device and the enterprise network to which the device is connected. Embodiments described herein thus provide for a web browser, operating on a user device, to render an error page to a user explaining or describing one or more rules or policies associated with an enterprise network that prohibit a host device from accessing a requested URL while connected to the enterprise network, without forcing the user to install a security service root CA in the browser.

Figure 1:
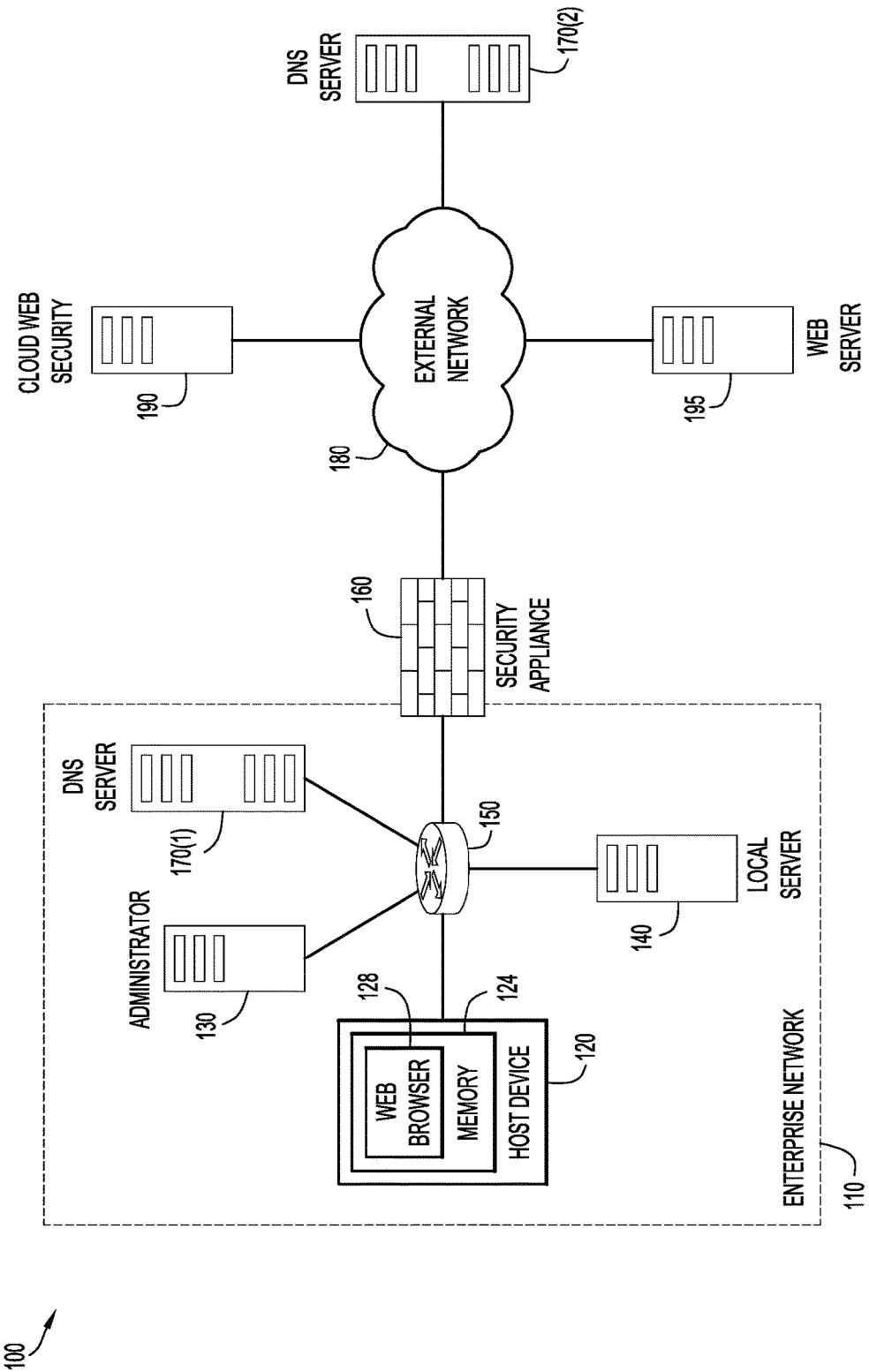
FIG. 1 is a diagram illustrating an automated notification system in which an end user is notified why access to a given website is blocked, according to an example embodiment.

FIG. 1 depicts a block diagram of a policy notification system 100 in accordance with an example embodiment. System 100 includes a host device 120 (i.e., a user device) having a memory 124, which stores computer-readable instructions that when executed perform the functionality of a web browser 128. System 100 further includes an enterprise network 110, which comprises an administrator server 130, a local server 140, router 150, security appliance 160, and a DNS server 170(1). System 100 still further comprises an external network 180, a DNS server 170(2), a CWS server 190 and a web server 195.

As shown in FIG. 1, host device 120 is in communication, within enterprise network 110, with administrator 130, local server 140 and DNS server 170(1) via router 150. Host device 120 is in further communication, via external network 180, with DNS server 170(2), CWS server 190 and web server 195. It should be appreciated that external network 180 may include one or more wide area networks (WANs), such as the Internet, and one or more local area networks (LANs).

Host device 120 may be a wired or wireless communication device and may operate in accordance with any communication/network technology, including, but not limited to, Ethernet, Wi-Fi®, Bluetooth®, 4G or LTE, etc. For example, host device 120 may be a laptop, tablet, smartphone, server, etc.

Security appliance 160 may be any network device, such as a router, switch, firewall, gateway, etc. DNS servers 170(1), 170(2) (or generally DNS server 170(N)) may be any device that is configured to receive one or more DNS requests for an IP address associated with a URL from host device 120 and is further configured to send a DNS response message to host device 120 that, in accordance with the embodiments described herein, may include an error code indicating a rule or policy associated with enterprise network 110 prohibiting host device 120 from accessing the requested URL.

Generally, and as will be explained in more detail below, in deployments such as those shown in FIG. 1, to prevent security threats or vulnerabilities caused by frustrated or confused users of host devices 120, it may be desirable to notify a user of host device 120 connected to enterprise network 110 why the user was not permitted access to a website or server associated with a given URL. Accordingly, the system and method described herein provide for a mechanism wherein web browser 128 running on host device 120 may generate and render an HTML error page to a user of host device 120 that identifies and explains one or more rules or policies associated with enterprise network 110 that prohibit the user of host device 120 from accessing a website or server associated with a specific URL.

In operation, upon power-up or when host device 120 joins enterprise network 110, web browser 128 running on host device 120 may obtain network configuration information, e.g., from DNS server 170(N) or local server 140, including blocked domain names and their subnet masks. For example, host device 120 may send a DNS query to a DNS server, e.g., 170(1) or 170(2), requesting block policy information including addresses, e.g., A (IPv4) or AAAA (IPv6), associated with one or more blocked domain names. In response, DNS server, e.g., 170(1) or 170(2), may send browser 128 a DNS response including the requested block policy information. According to an embodiment, browser 128 may be preconfigured with the domain name information associated with DNS servers that have been preconfigured to implement one or more security policies associated with enterprise network 110, e.g., 170(1) and 170(2), and may use the Domain Name System Security Extension (DNSSEC) protocol to validate a DNS response received from a DNS server, e.g., 170(1) or 170(2). According to a further embodiment, web browser 128 may store the addresses, subnet masks and associated URLs received from DNS server 170(N) until a time-to-live (TTL) counter, included in the response, expires. For example, if web browser 128 receives a request to reach a prohibited URL that matches a previously received request, web browser 128 may confirm whether the TTL associated with the previously received request has expired, and, if not, web browser 128 may render an error page using the previously received error codes without generating a new DNS request.

Thus, during normal operation, when browser 128 receives a DNS response including an A or an AAAA address matching a block policy IP address or associated subnet mask, browser 128 may recognize the A or an AAAA address and, if so, does not attempt to connect to the IP address or authenticate a certificate associated with the address. Instead, browser 128 displays a static, language-appropriate error page, in whatever form browser 128 is configured to display. The error page may comprise a link to a URL included in the received block policy information and a reason for the blocked access to the requested URL, as indicated by an error code included in the received address information. For example, when joining enterprise network 110, browser 128 may receive a configuration file, e.g., from local server 140 or DNS server 170(1), that comprises a list of one or more error codes, enabling browser 128 to map an error code, included in a subsequently received DNS response, to a rule or policy associated with enterprise network 120. According to an embodiment, the last octet of an IPv4/IPv6 address included in the DNS response may be mapped to an error code that browser 128 may use to display language-relevant errors to the user, informing the user why host device 120 was denied access to a given URL or server.

Web browser 128 running on host device 120 may therefore map the last octet of an IPv4/IPv6 address received in a DNS response to a predefined error code, enabling browser 128 to indicate, on an error page displayed to a user, one or more rules or policies prohibiting host device 120 from accessing a requested URL. The predefined error codes may be preconfigured on a DNS server, e.g., DNS server 170(1) or 170(2), and may indicate a specific reason for blocking host device 120 from accessing a requested URL, e.g., 1=unknown, 2=malware, 3=games, 4=gambling, etc. For example, if the last octet in an IP address included in a DNS response were a "3," web browser 128 may render an error page indicating to the user that the polices associated with enterprise network 110 prohibit host device 120 from accessing game-related websites. It should be appreciated that the list of predefined error codes shown above is merely exemplary and, as such, any number of predefined error codes may be used to indicate any number of reasons prohibiting host device 120 from accessing a requested URL. According to an embodiment, the predefined code values may be registered with the World-Wide Web Consortium (W3C) or with the Internet Assigned Numbers Authority (IANA). It should be further appreciated that the notification functionality of web browser 128 may be included in a plug-in or extension to a commercial web browser, e.g., Firefox, Chrome, Explorer, etc., or may be integrated directly into the functionality of browser 128. Finally, the predefined error codes may be stored within memory of browser 128 prior to browser 128 sending any DNS requests for a prohibited URL.

To remain seamless to the user of host device 120, browser 128 may automatically connect to a telemetry URL provided in the received block policy information. That is, browser 128 may be configured to report to or notify a telemetry server regarding the attempted access to a blocked URL. Furthermore, the user of host device 120 may click on a link to the URL displayed on the error page to report a false positive or to reach a Hyper Text Markup Language (HTML) webpage explaining, in greater detail, the rules and policies associated with enterprise network 110 that prohibit host device 120 from accessing the requested URL. Optionally, when the user clicks the link to the URL displayed on the error page, browser 128 may retrieve an HTML webpage explaining the rules and policies associated with enterprise network 110 from a memory accessible to browser 128, e.g., memory 124 located on host device 120 or from, e.g., local server 140.

Figure 2:
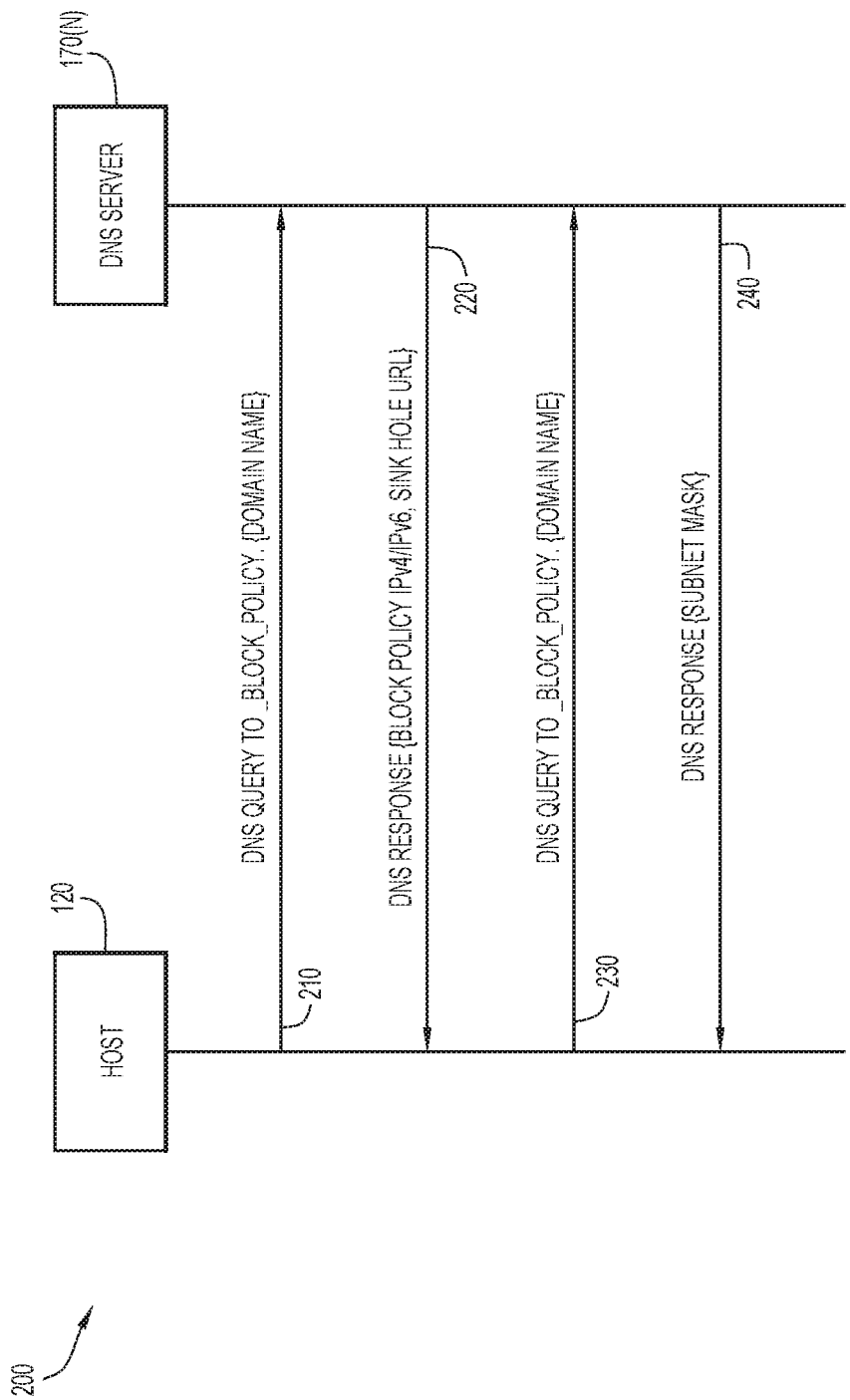
FIG. 2 is a signal diagram illustrating communications in a policy notification system between a host device and a Domain Name System (DNS) server, according to an example embodiment.

Reference is now made to FIG. 2, which shows a signal diagram illustrating communications 200 occurring between a host device 120 and DNS server 170(N) (also shown in FIG. 6), performing the operations of the policy notification system of FIG. 1, according to an embodiment. As shown in FIG. 2, at 210, browser 128 running on host device 120 sends a DNS query to DNS server 170(N) requesting block policy configuration information associated with a given domain name, e.g., "_block_policy.{domain name}." At 220, DNS server 170(N) sends a DNS response to browser 128 that may include an A or AAAA address record associated with the requested URL. According to an alternative embodiment, the A and/or AAAA address record included in the DNS response may be a false IP address, indicating to browser 128 that access to the requested URL is blocked due to one or more rules and policies associated with enterprise network 110.

The DNS response from DNS server 170(N)) may further include a text (TXT) record indicating a sinkhole URL associated with the requested URL that, optionally, may identify an HTML page containing information detailing the corporate policy and rules restricting access to the requested URL, which host device 120 may include on an error page rendered to the user of host device 120. For example, if the user clicks on a link to the sinkhole URL included in an error page, the browser may automatically access an HTML page stored on local server 140 and display the HTML page to the user. DNS server 170(N) therefore may receive, from browser 128, a DNS request for an IP address associated with a domain hosting a restricted or malicious URL, and, in response, return an IP address associated with a sinkhole URL that may be hosted on local server 140. In so doing, browser 128 is prevented from reaching the restricted or malicious URL and, instead, may initiate a connection with the sinkhole URL, e.g., local server 140.

According to an embodiment, the DNS response may further include a TXT record indicating a telemetry URL, enabling the browser to automatically connect to the telemetry URL identified in the received block policy information without authenticating a certificate associated with the telemetry URL or hindering content display or rendering by the telemetry URL server. For example, the telemetry URL may correspond to an HTML page stored on web server 195 that browser 128 may automatically access after receiving the DNS response from DNS server 170(N).

If browser 128 running on host device 120 recognizes that the A or AAAA address record included in the DNS response matches a previously received address or, optionally, that the DNS response is a false IP address and therefore is not a routable IP address, browser 128 does not attempt to authenticate a certificate associated with the received IP address. Instead, at 230, browser 128 may send a DNS query to DNS server 170(N) requesting a subnet mask associated with the IP address, which may include an error code identifying the reason why access to the requested URL is blocked. As discussed above, web browser 128 running on host device 120 may map the last octet of a subnet mask associated with an IPv4/IPv6 address to a predefined error code, enabling browser 128 to indicate, on an error page displayed to the user, one or more rules or policies prohibiting the user from accessing a requested URL. Alternatively, the error code could be provided in the "first" DNS response sent at step 220 such that browser 128 would not need to execute another DNS request to obtain the last octet of the subnet mask. At 240, DNS server 170(N) may send a DNS response to browser 128 that includes a subnet mask comprising an error code indicating to browser 128 one or more rules or policies associated with enterprise network 110 that prohibit host device 120 from accessing the requested URL. That is, while the A or AAAA address record included in the DNS response is generally a routable IP address, browser 128 does not attempt to connect to the URL or server associated with the address record if browser 128 recognizes the address. Instead, browser 128 displays an error page indicating one or more rules or policies prohibiting the user from accessing a requested URL.

Figure 3:
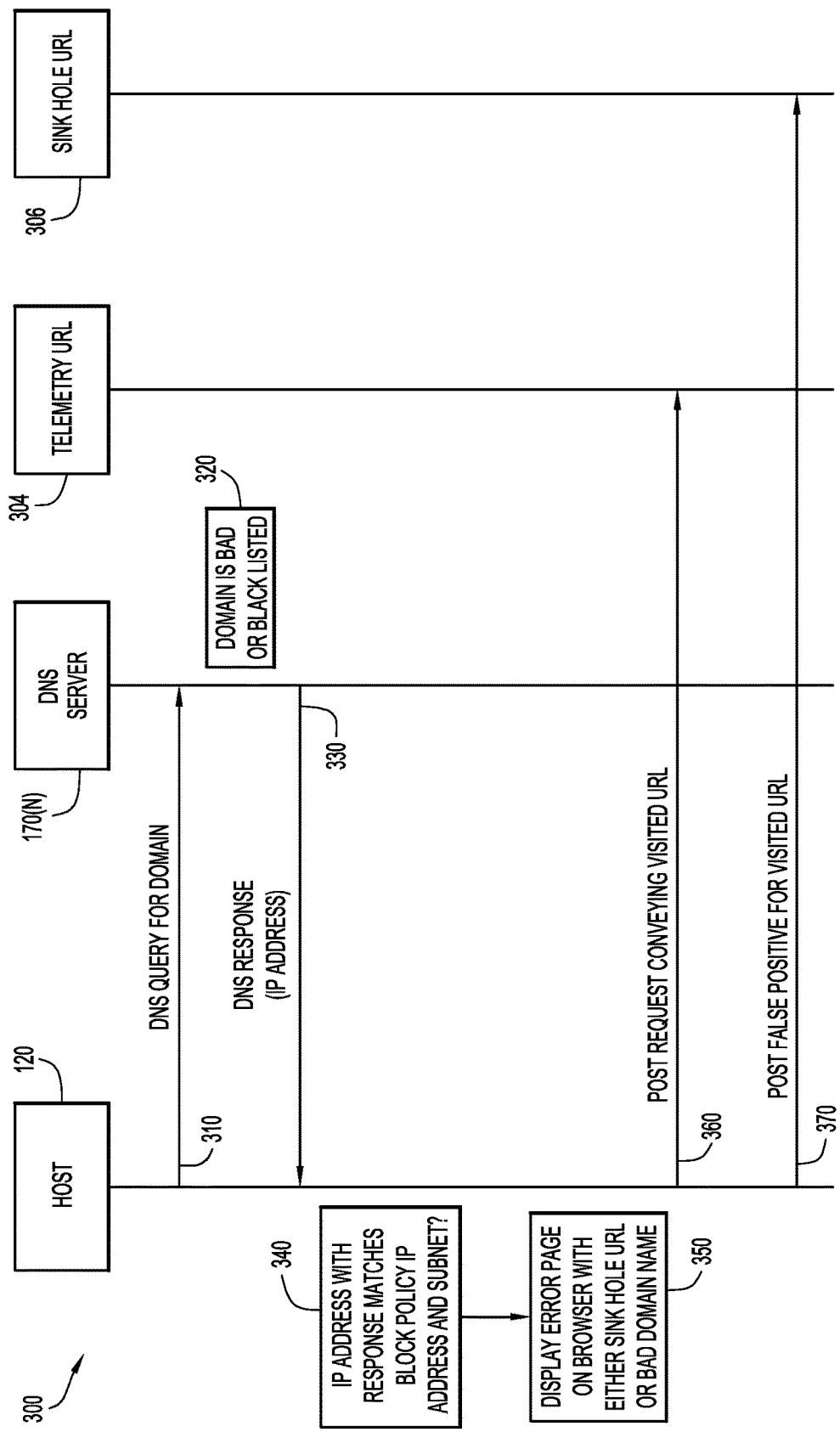
FIG. 3 is a signal diagram illustrating communications in a policy notification system among a host device, a DNS server, a telemetry URL and a sinkhole URL, according to an example embodiment.

Reference is now made to FIG. 3, which shows a signal diagram illustrating communications 300 occurring among a host device 120, DNS server 170(N), a telemetry URL 304 and a sinkhole URL 306 performing the operations of the policy notification system of FIG. 1, according to an embodiment. As shown in FIG. 3, at 310, web browser 128 running on host device 120 sends a DNS query to DNS server 170(N) requesting IP address information associated with a given domain name. According to an embodiment, DNS server 170(N) may be an OpenDNS server. At 320, DNS server 170(N) determines whether the domain name in the DNS query is unknown, i.e., is "bad," or is included in a preconfigured block list of domain names, e.g., a block policy list, identifying one or more domains names that are not reachable by devices connected to enterprise network 110. According to an embodiment, the block list is preconfigured by an administrator of enterprise network 110. At 330, DNS server 170(N) sends a DNS response to browser 128 that may include an A or AAAA address record associated with the requested URL. As discussed above with reference to FIG. 2, the A and/or AAAA address record included in the DNS response may be an IP address that was included in a previous DNS response, indicating to browser 128 that access to the requested URL is blocked due to one or more rules and policies associated with enterprise network 110.

If DNS server 170(N) determines that the domain name included in the DNS query from host device 120 is unknown, DNS server 170(N) may further include an address associated with telemetry URL 304 in a TXT record included in the DNS response. If DNS 170(N) determines that the domain name included in the DNS query is on the preconfigured block list associated with enterprise network 110, DNS server 170(N) may include address information associated with sinkhole URL 306 in a TXT record included in the DNS response. At 340, browser 128 receives the DNS response from DNS server 170(N) and determines whether the IP address included in the DNS response matches an IP address and subnet mask included in the preconfigured block policy list associated with enterprise network 110. If so, browser 128 does not attempt to authenticate a certificate associated with the IP address received in the DNS response. Instead, at 350, browser 128 displays an error page to the user identifying one or more rules or policies associated with enterprise network 110 that correspond to an error code included in the DNS response and prohibit the user from accessing the requested URL.

If the DNS response to host device 120 includes an address associated with telemetry URL 304, web browser 128 may, at 360, send a POST request conveying the visited URL, and optionally the 5-tuple used to make the original DNS query request, to telemetry URL 304, enabling telemetry URL 304 to use this information for reporting the DNS query. Optionally, telemetry URL 304 may further send a return message to web browser 128 indicating one or more reasons for abruptly terminating the session of host device 120, which browser 128 may include in an error page rendered to the user of host device 120. At 370, if the DNS response to host device 120 includes sinkhole URL 306 in a TXT record, web browser 128 may send a POST message to sinkhole URL 306 indicating a false positive for the visited URL.

Figure 4:
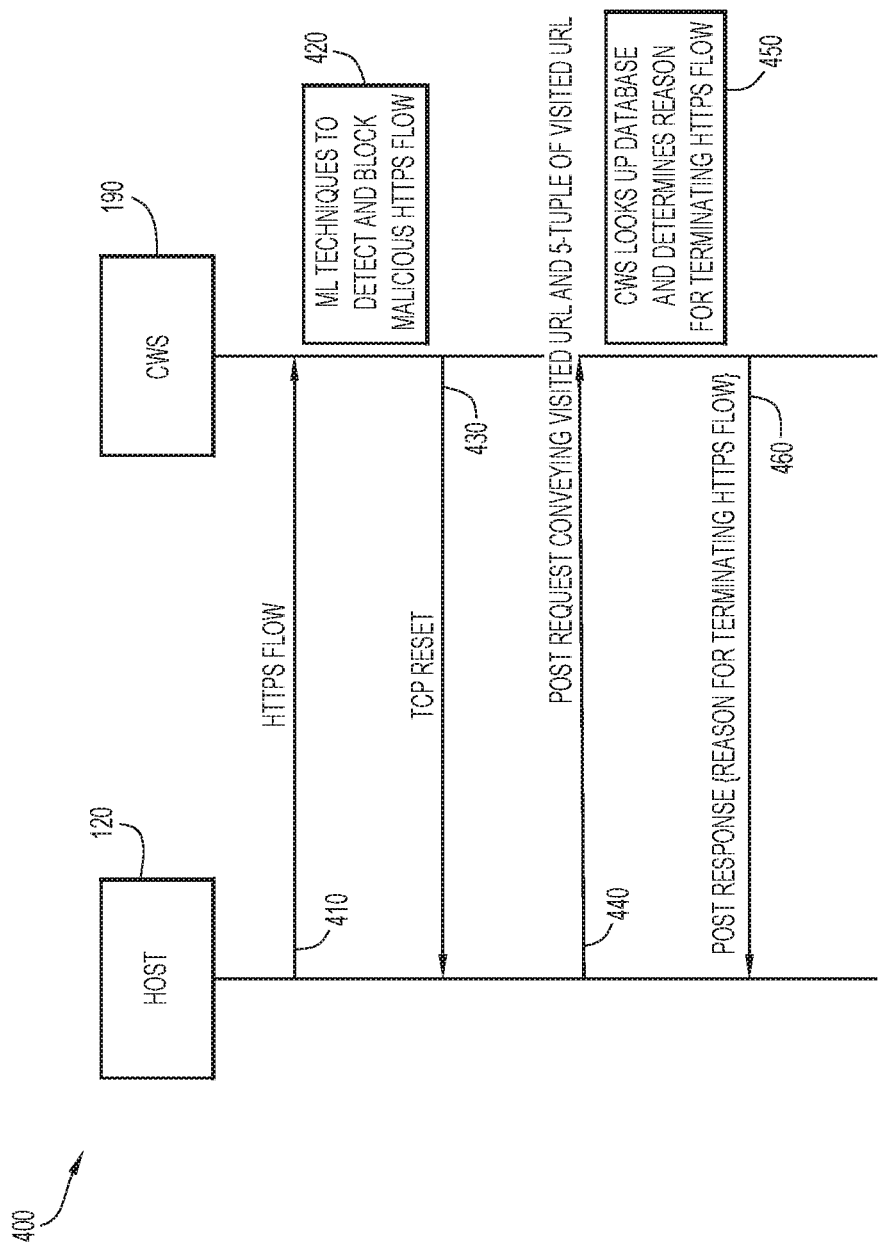
FIG. 4 is a signal diagram illustrating communications in a policy notification system among a host device, a cloud web security (CWS) server, and a telemetry URL, according to an example embodiment.

Reference is now made to FIG. 4, which shows a signal diagram illustrating communications 400 occurring among a host device 120, a CWS server 190, and a telemetry URL 304 performing the operations of the policy notification system of FIG. 1, according to an embodiment. As shown in FIG. 4, at 410, browser 128 running on host device 120 may initially transmit an encrypted HTTPS data flow to reach a domain hosting a URL requested by a user of host device 120.

At 420, CWS server 190 may use ML techniques to detect and block malicious HTTPS flows. For example, ML classifiers may identify malicious flows, benign flows and identify the application type that initiated the data flows (e.g., file transfer, one-way video streaming, etc.). At 430, if CWS server 190 identifies the encrypted HTTPS data flow as being a malicious flow, the ML classifier may program the on-path TCP proxy or middle-box to perform a TCP reset to reset the TCP connection initiated by browser 128, either directly or indirectly using a SDN controller. CWS server 190 may further update a database of HTTPS data flows that were abruptly terminated, and the reasons for terminating these flows, by including a record of the terminated data flow in the database.

At 440, in response to the TCP connection being reset, web browser 128 running on host device 120 sends a POST request conveying the visited URL, and the 5-tuple associated with the visited URL, to CWS server 190, requesting the reason why CWS server 190 abruptly terminated the TCP connection to the visited URL. At 450, CWS server 190 performs a lookup in the database of HTTPS data flows that were abruptly terminated to determine the reason for blocking the TCP connection initiated by browser 128. At 460, CWS server 190 sends a POST response to host device 120 indicating the reason for terminating the connection, enabling the web browser running on host device 120 to display an appropriate error page to the user. Optionally, if the database lookup is unsuccessful, CWS server 190 may send a POST response to host device 120 indicating that CWS server 190 does not know why the TCP connection initiated by browser 128 was terminated.

Figure 5:
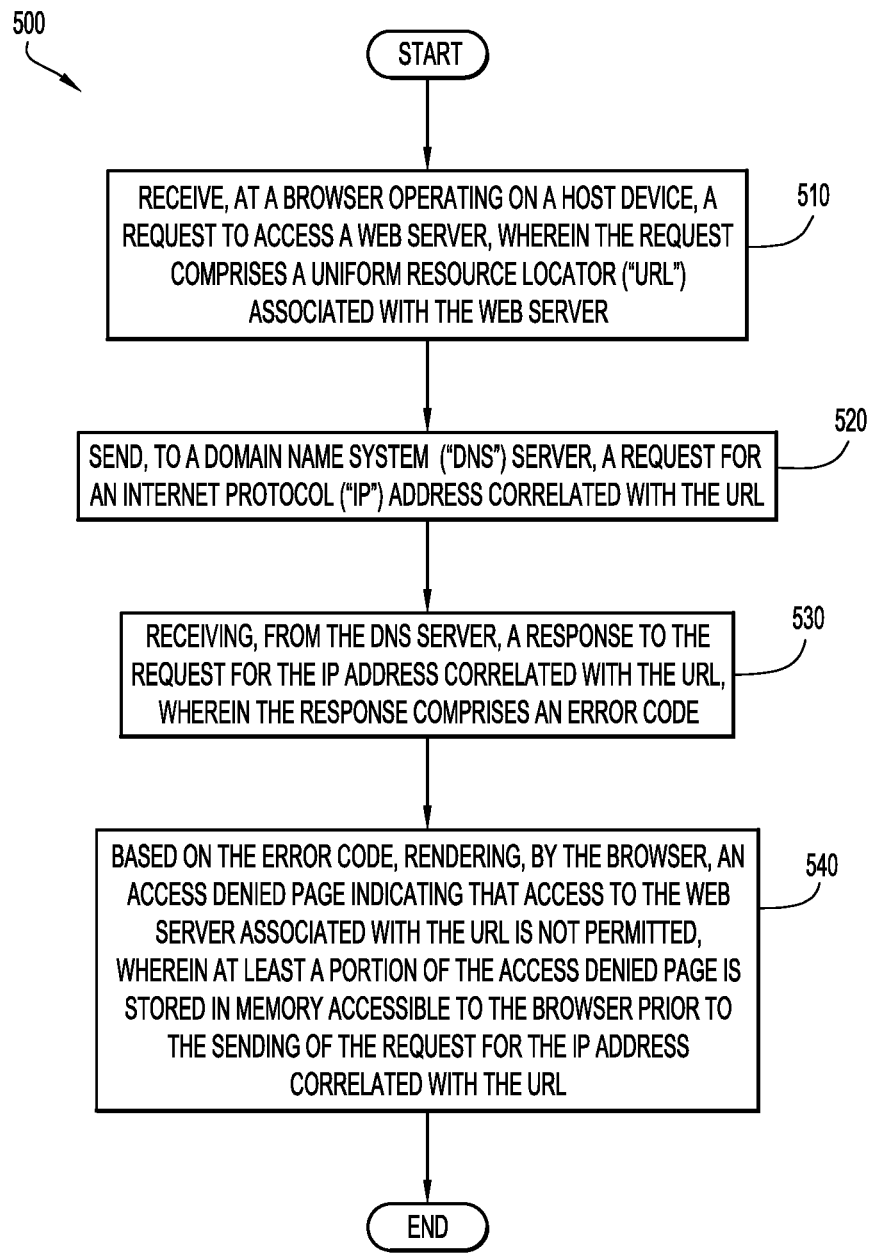
FIG. 5 is a flowchart depicting operations performed by a host device to request access to a blocked URL, according to an example embodiment.

With reference to FIG. 5, and continued reference to FIGS. 1-4, a flowchart is shown of a process 500 performed by a browser running on host device 120 to render an access denied page indicating to an end user a reason why a URL requested by the end user is not reachable, according to an example embodiment.

At 510, browser 128 running on host device 120 receives a request to access a web server, e.g., web server 195, wherein the request comprises a URL associated with the web server.

At 520, browser 128 sends, to a DNS server, e.g., 170(1), a request for an IP address correlated with the domain that is hosting the URL.

At 530, browser 128 receives, from the DNS server, e.g., 170(1), a response to the request for the IP address correlated with the domain hosting the URL, wherein the response comprises an error code.

Figure 6:
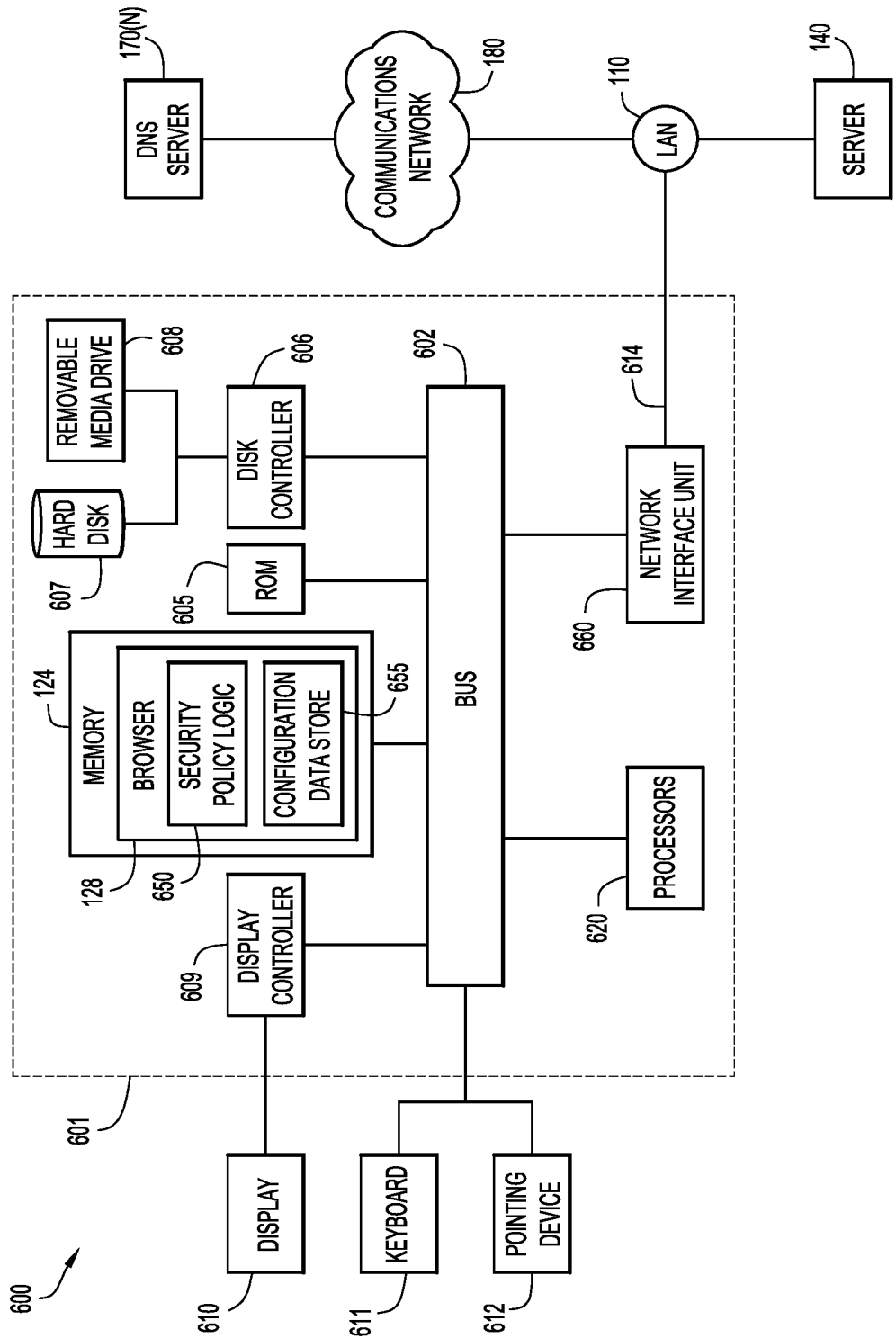
FIG. 6 is a block diagram of a host device configured to participate in the operations of the policy notification system, according to an example embodiment.

At 540, based on the error code, browser 128 renders an access denied page indicating that access to the web server, e.g., web server 195, associated with the URL is not permitted, wherein at least a portion of the access denied page is stored in memory accessible to browser 128 prior to the sending of the request for the IP address correlated with the domain hosting the URL FIG. 6 illustrates a system environment 600 in which the embodiments presented may be implemented. As shown in FIG. 6, system environment 600 may include a computer system 601 communicating with server 140 through a local area network (LAN) 110, and one or more DNS servers 170(N) communicating with computer system 601 over communication network 180.

The computer system 601 may be programmed to implement a computer based device, such as a host device 120, for notifying a user requesting access to a web site associated with a given URL one or more reasons why access to the requested website is not permitted. The computer system 601 includes a bus 602 or other communication mechanism for communicating information, and a processor 620 coupled with the bus 602 for processing the information. While FIG. 6 shows a signal block 620 for a processor, it should be understood that the processors 620 represent a plurality of processing cores, each of which can perform separate processing. The computer system 601 also includes a main memory 124, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 620. In addition, the main memory 124 may be used for storing temporary variables or other intermediate information during the execution of instructions by the processor 620.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 620.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such a liquid crystal display, light emitting diode (LED) display, etc., for displaying information to a computer user. The computer system 600 includes input devices, such as a keyboard 611 and a pointing device 612, for interacting with a computer user and providing information to the processor 620. The pointing device 612, for example, may be a mouse, a trackball, or a pointing stick for communicating direction information and command selections to the processor 620 and for controlling cursor movement on the display 610. In addition, a printer may provide printed listings of data stored and/or generated by the computer system 601.

The computing system 601 performs a portion or all of the processing steps described herein in response to the processor 620 executing one or more sequences of one or more instructions contained in a memory, such as the main memory 124. Such instructions may be read into the main memory 124 from another computer readable medium, such as a hard disk 607 or a removable media drive 608. One or more processors in a multi-processing arrangement may also be employed to execute the sequences of instructions contained in main memory 124. In alternative embodiments, hard-wired circuitry may be used in place of or in combination with software instructions. Thus, embodiments are not limited to any specific combination of hardware circuitry and software.

For example, the one or more processors 620 may be a microprocessor or a microcontroller. The memory 124 may include read only memory (ROM), random access memory (RAM), magnetic disk storage media devices, optical storage media devices, flash memory devices, electrical, optical, or other physical/tangible memory storage devices. Thus, in general, memory 124 may include one or more tangible (non-transitory) computer readable storage media (e.g., a memory device) encoded with software comprising computer executable instructions and when the software is executed (by processor 620) it is operable to perform the operations of the host device 120 described herein.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the described embodiments, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

For example, security policy logic 650 includes instructions enabling browser 128 to determine that an IP address received in a DNS response from a DNS server, e.g., 170(1), includes an error code indicating one or more rules or policies prohibiting browser 128 from reaching a domain associated with the requested URL and, based on the error code, to render an access denied page indicating why access to the domain associated with the URL was blocked, wherein at least a portion of the access denied page is stored in memory 124. For example, security policy logic 650 may recognize that an IP address received in a DNS response includes an error code indicating that access to the domain associated with the requested URL was denied because the domain associated with the requested URL is a social networking website, e.g., Facebook, and render an access denied page indicating to the user that the policies of enterprise network 110 prohibit users from accessing social network sites while connected to enterprise network 110. Optionally, security policy logic 650 may further render, on the access denied page, a link to an HTML webpage that describes, in greater detail, the rules and policies associated with enterprise network 110 prohibiting access to the domain associated with the requested URL.

The computer code devices may be any interpretable or executable code mechanism, including but not limited to scripts, interpretable programs, and dynamic link libraries (DLLs), Java classes, and complete executable programs. Moreover, parts of the processing may be distributed for better performance, reliability, and/or cost.

The computer system 601 also includes a network interface 660 coupled to the bus 602. The communication interface 660 provides a two-way data communication coupling to a network link 614 that is connected to, for example, a LAN 110, or to another communications network 180 such as the Internet. For example, the network interface 660 may be a wired or wireless network interface card to attach to any packet switched (wired or wireless) LAN. As another example, the network interface 660 may be an asymmetrical digital subscriber line (ADSL) card, an integrated services digital network (ISDN) card or a modem to provide a data communication connection to a corresponding type of communications line. Wireless links may also be implemented. In any such implementation, the network interface 660 sends and receives electrical, electromagnetic or optical signals that carry digital data streams representing various types of information.

The network link 614 typically provides data communication through one or more networks to other data devices. For example, the network link 614 may provide a connection to another computer through a local area network 110 (e.g., a LAN) or through equipment operated by a service provider, which provides communication services through a communications network 180. The local network 110 and the communications network 180 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the network interface 660, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 110 and 180, the network link 614 and the network interface 660. Moreover, the network link 614 may provide a connection through a LAN 110 to a host device 120, such as a personal digital assistant (PDA) laptop computer, cellular telephone, or server. The network link 614 may further provide a connection through the communications network 180 to one or more DNS servers 170(N).

The memory 124 stores executable software instructions for browser 128 and security policy logic 650, and data for configuration data store 655. The controller further includes one or more network interface units 660 that enable communications to server 140 and to one or more DNS servers 170(N).

Figure 7:
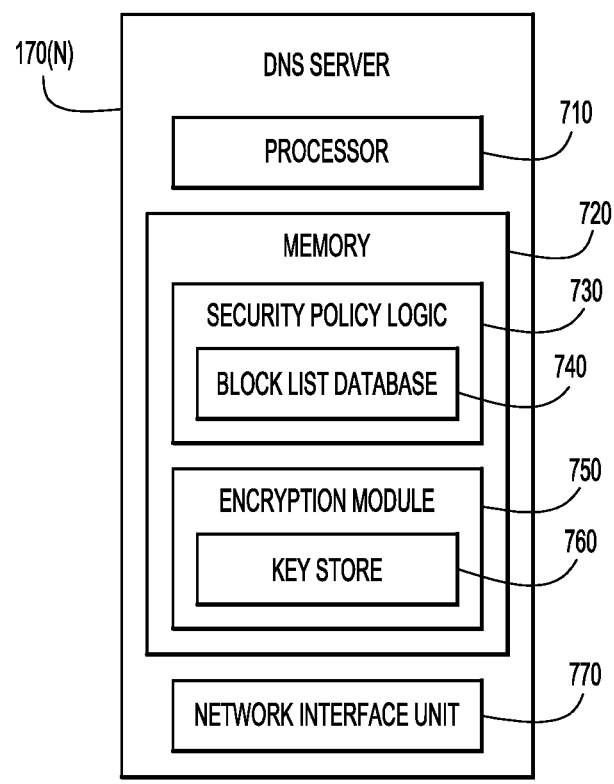
FIG. 7 is a block diagram of a computing device configured to perform the operations of a DNS server in the operations of the policy notification system, according to an example embodiment.

Reference is now made to FIG. 7, which shows a DNS server 170(N) in more detail, according to an embodiment. As shown in FIG. 7, DNS server 170(N) may include one or more processors 710 and a memory 720. The memory 720 stores executable software instructions for security policy logic 730 and encryption module 750, and data for block list database 740 and key store 760. The controller further includes one or more network interface units 770 that enable communications with host device 110 and one or more DNS servers 170(N).

The one or more processors 710 may be a microprocessor or a microcontroller. The memory 720 may include read only memory (ROM), random access memory (RAM), magnetic disk storage media devices, optical storage media devices, flash memory devices, electrical, optical, or other physical/tangible memory storage devices. Thus, in general, memory 720 may include one or more tangible (non-transitory) computer readable storage media (e.g., a memory device) encoded with software comprising computer executable instructions and when the software is executed (by processor 710) it is operable to perform the operations of DNS server 170(N) described herein.

Security policy logic 730 may include instructions enabling DNS server 170(N) to enforce one or more rules or policies associated with enterprise network 110 by determining whether a URL requested in a DNS query is included in the block list 740 for enterprise network 110, and, if so, generating a DNS response including an error code indicating the one or more rules or polices associated with enterprise network 110 that prohibit host device 120 from accessing the requested URL. For example, in response to receiving a DNS query for a URL associated with a social networking website, e.g., Facebook.com, DNS server 170(1) may return a DNS response including an error code indicating that access to the requested URL is denied because one or more preconfigured rules or policies associated with enterprise network 110 prohibit host device 120 from accessing social networking websites or servers while connected to enterprise network 110.

Security policy logic 730 may further include instructions enabling DNS server 170(N) to perform lookup functions on block list database 740 to determine whether access to a requested URL has been blocked in accordance with one or more rules or policies associated with enterprise network 110. According to an embodiment, a system administrator associated with enterprise network 110 may preconfigure block list 740 with one or more domain names and URLs that are prohibited by the rules and policies associated with enterprise network 110 and including one or more reasons why access to the one or more domain names or URLs is prohibited.

Encryption module 750 may include instructions enabling DNS server 170(N) to establish a secure communication channel with host device 120, including generating encryption keys to establish an HTTPS session with host device 120. According to an embodiment, encryption module 750 may further include a key store 760 that may store one or more private encryption keys uniquely associated with DNS server 170(N), one or more public encryption keys associated with one or more host devices 120 and one or more encryption keys associated with HTTP sessions with one or more host devices 120.

The embodiments disclosed herein allow a web browser running on a host device to render an access denied page notifying a user that access to a requested website or server has been denied and identifying one or more rules or policies associated with an enterprise network that prohibited access to the requested URL. As further disclosed herein, a DNS server may be configured to enforce one or more rules or policies associated with an enterprise network by returning an IP address comprising an error code corresponding to a rule or policy associated with the enterprise network, enabling the browser to render an access denied page identifying to a user one or more reasons why access to a requested URL was denied. Optionally, the IP address may not correspond to a reachable IP address. For example, in response to receiving a DNS query seeking address information associated with a URL requested by a user, the DNS server may be configured to perform a database lookup on a list of domain names and URLs to determine whether access to the URL is prohibited, and if so, to generate an IP address including an error code indicating the reason why access to the URL was denied. A system administrator of an enterprise network may preconfigure a block list database stored in the memory of a DNS server to include a list of one or more domain names and URLs to which access is prohibited and the reasons why access to the domain names and URLs is prohibited.

A browser running on a host device may be further configured to recognize an IP address included in a DNS response as including an error code and, in response, to decode the error code and to render an access denied page based on the decoded error code explaining why access to the requested URL was denied. To facilitate the rendering of an access denied page, the browser may be configured to store at least a portion of the access denied page in memory accessible to the browser prior to the sending the original DNS query for the IP address correlated with the domain that is hosting the URL. Optionally, the browser may further include, on the rendered access denied page, a link to a URL comprising an HTML page explaining, in greater detail, one or more rules or policies prohibiting a host device from reaching a website or server associated with a requested URL. For example, the access denied page rendered by the browser may include a link to an HTML page residing on a local server in the enterprise network, such that when a user clicks on the link in the access denied page, the browser renders to the user the HTML page stored on the local server.

Advantages of the embodiments include explaining to an end user why access to a requested website is not permitted in accordance with the rules and policies associated with an enterprise network to which the end user is connected, thereby reducing the likelihood that the end user will use insecure interfaces to reach a prohibited web site, increasing the security and integrity of the enterprise network. Furthermore, because a browser running on a host device may be preconfigured to recognize an IP address returned in a DNS response, the browser will not attempt to authenticate a certificate associated with the returned IP address. Thus, a further advantage of the present embodiment is that a root CA does not need to be installed on a web browser or a host device, e.g., a BYOD device, prior to performing the operations described herein. As such, the present embodiment eliminates the need to install a security service root CA on the web browser and therefore works both with the HTTP Strict Transport Security (HSTS) protocol and with pre-loaded certificate pinning in web browsers. Accordingly, the disclosed embodiments may improve end user security when performing DNS-based blocking or terminating a TCP connection, while still providing telemetry to a URL that the end user is attempting to access.

In sum and in accordance with one embodiment, a method and system are disclosed in which a browser operating on a host device receives a request to access a web server, wherein the request comprises a URL associated with the web server, and sends, to a DNS server, a request for an IP address correlated with the domain that is hosting the URL. The browser then receives, from the DNS server, a response to the request for the IP address correlated with the domain that is hosting the URL, wherein the response comprises an error code. Based on the error code included in the DNS response, the browser renders an access denied page indicating why access to the web server associated with the URL is not permitted. In so doing, the embodiment disclosed herein provides a method wherein a browser may expressly notify an end user why access to a requested website or server is prohibited, reducing the frustration of the end user and increasing the security and integrity of the network to which the end user is connected.

In one form, a method is provided comprising: receiving, at a browser operating on a host device, a request to access a web server, wherein the request comprises a URL associated with the web server; sending, to a DNS server, a request for an IP address correlated with the domain that is hosting the URL; receiving, from the DNS server, a response to the request for the IP address correlated with the domain that is hosting the URL, wherein the response comprises an error code; and based on the error code, rendering, by the browser, an access denied page indicating that access to the web server associated with the URL is not permitted, wherein at least a portion of the access denied page is stored in memory accessible to the browser prior to the sending of the request for the IP address correlated with the domain that is hosting the URL.

In another form, a non-transitory computer readable storage media storing executable instructions that are operable in a computing device is provided to perform operations to: receive a request to access a web server, wherein the request comprises a URL associated with the web server; send, to a DNS server, a request for an IP address correlated with the domain that is hosting the URL; receive, from the DNS server, a response to the request for the IP address correlated with the domain that is hosting the URL, wherein the response comprises an error code; and based on the error code, render an access denied page indicating that access to the web server associated with the URL is not permitted, wherein at least a portion of the access denied page is stored in memory accessible to the browser prior to the sending of the request for the IP address correlated with the domain that is hosting the URL.

In yet another form, a method is provided comprising: at a Cloud Web Security (CWS) server: receiving, from a browser, an encrypted data flow configured to reach a domain hosting a URL requested by a user; determining whether the encrypted data flow is malicious using Machine Learning ("ML") techniques; if the encrypted data flow is determined to be malicious, terminating a Transmission Control Protocol ("TCP") connection associated with the encrypted data flow and updating a database to include information associated with the encrypted data flow, wherein the TCP connection is terminated by a software defined network controller; receiving, from the browser, a request for a reason why the TCP connection was terminated; performing a lookup on the database to retrieve the information associated with the encrypted data flow; and based on the information associated with the encrypted data flow, sending a message to the browser indicating the reason for terminating the TCP connection, enabling the browser to display an error page to the user.

The above description is intended by way of example only. Various modifications and structural changes may be made therein without departing from the scope of the concepts described herein and within the scope and range of equivalents of the claims.

What is claimed is:

1. A method comprising:
   receiving, at a browser operating on a host device, a request to access a web server, wherein the request comprises a Uniform Resource Locator (URL) associated with the web server;
   sending, to a Domain Name System (DNS) server, a request for an Internet Protocol (IP) address correlated with a domain hosting the URL;
   receiving, from the DNS server, a response to the request for the IP address correlated with the domain hosting the URL, wherein the response comprises a block policy IP address and an error code; and
   based on the block policy IP address and the error code indicated in the response, rendering, by the browser, an access denied page indicating that access to the web server associated with the URL is not permitted, wherein at least a portion of the access denied page is stored in memory accessible to the browser prior to the sending of the request for the IP address correlated with the domain hosting the URL,
   wherein the block policy IP address comprises a subnet mask indicating a category of content hosted by the web server associated with the URL, wherein the category of content is prohibited by a rule or policy associated with an administrative domain to which the host device is connected.

2. The method of claim 1, wherein the block policy IP address does not correspond to a reachable IP address.

3. The method of claim 1, wherein an indication of the category is rendered in the access denied page.

4. The method of claim 1, wherein the error code is indicated in a last octet of the block policy IP address.

5. The method of claim 1, further comprising receiving, at the browser, a first configuration file, wherein the first configuration file includes a first set of error codes.

6. The method of claim 5, wherein the host device receives the first configuration file in response to logging onto an administrative domain.

7. The method of claim 5, wherein the first configuration file further includes a Time to Live (TTL) parameter associated with the first set of error codes, wherein the TTL parameter indicates a duration that the first set of error codes is valid.

8. The method of claim 1, wherein the access denied page includes a selectable link, which when selected, causes the browser to render rules or policies associated with an administrative domain to which the host device is connected.

9. The method of claim 1, further comprising determining, by the browser, that the response to the request for the IP address correlated with the domain hosting the URL is not a valid response, wherein the determining is made without using a root certificate associated with a security server.

10. The method of claim 1, further comprising sending a message to a URL provided in the response, wherein the message comprises an indication notifying a server associated with the URL provided in the response of the request for the IP address correlated with the domain hosting the URL.

11. The method of claim 1, wherein the rendering of the access denied page is triggered by a plug-in extension to the browser operating on the host device.

12. An apparatus comprising:
- a network interface unit configured to enable network communications;
- a memory; and
- a processor, coupled to the network interface unit and the memory, and configured to:
  - receive a request to access a web server, wherein the request comprises a Uniform Resource Locator (URL) associated with the web server;
  - send, to a Domain Name System (DNS) server, a request for an Internet Protocol (IP) address correlated with a domain hosting the URL;
  - receive, from the DNS server, a response to the request for the IP address correlated with the domain hosting the URL, wherein the response comprises a block policy IP address and an error code; and
  - based on the block policy IP address and the error code indicated in the response, render an access denied page indicating that access to the web server associated with the URL is not permitted, wherein at least a portion of the access denied page is stored in the memory prior to the sending of the request for the IP address correlated with the domain hosting the URL,
  - wherein the block policy IP address comprises a subnet mask indicating a category of content hosted by the web server associated with the URL, wherein the category of content is prohibited by a rule or policy associated with an administrative domain to which the host device is connected.

13. The apparatus of claim 12, wherein the processor is further configured to receive a first configuration file, wherein the first configuration file includes a first set of error codes.

14. The apparatus of claim 13, wherein the processor is further configured to receive the first configuration file in response to the apparatus logging onto an administrative domain.

15. A non-transitory computer readable storage media storing executable instructions that are operable in a computing device, to perform operations to:
- receive a request to access a web server, wherein the request comprises a Uniform Resource Locator (URL) associated with the web server;
- send, to a Domain Name System (DNS) server, a request for an Internet Protocol (IP) address correlated with a domain hosting the URL;
- receive, from the DNS server, a response to the request for the IP address correlated with the domain hosting the URL, wherein the response comprises a block policy IP address and an error code; and
- based on the block policy IP address and the error code indicated in the response, render an access denied page indicating that access to the web server associated with the URL is not permitted, wherein at least a portion of the access denied page is stored in memory accessible to the browser prior to the sending of the request for the IP address correlated with the domain hosting the URL,
- wherein the block policy IP address comprises a subnet mask and an octet indicating a category of content hosted by the web server associated with the URL.

16. The non-transitory computer readable storage media of claim 15, further comprising instructions that are operable to receive a first configuration file, wherein the first configuration file includes a first set of error codes.

17. The non-transitory computer readable storage media of claim 16, further comprising instructions that are operable to receive the first configuration file in response to logging onto an administrative domain.

* * * * *